United States Patent
Dunbar

[11] Patent Number: 5,335,628
[45] Date of Patent: Aug. 9, 1994

[54] INTEGRATED BOILER/FUEL CELL SYSTEM

[75] Inventor: William R. Dunbar, Kenosha, Wis.

[73] Assignee: Aqua-Chem, Inc., Milwaukee, Wis.

[21] Appl. No.: 118,388

[22] Filed: Sep. 3, 1993

[51] Int. Cl.5 ............................ F22B 33/00
[52] U.S. Cl. ........................ 122/1 R; 122/4 R; 122/7 R; 122/412; 429/17; 429/26
[58] Field of Search ............ 429/12, 26, 17; 122/412, 7 R, 1 R, 4 R

[56] References Cited

U.S. PATENT DOCUMENTS

| | | | |
|---|---|---|---|
| 4,333,992 | 6/1982 | Healy | 429/17 |
| 4,824,740 | 4/1989 | Abrams et al. | 429/26 X |
| 4,994,331 | 2/1991 | Cohen | 429/17 |

Primary Examiner—Edward G. Favors
Attorney, Agent, or Firm—Whyte Hirschboeck Dudek

[57] ABSTRACT

A fuel cell and a boiler are coupled in such a manner that the water used to capture excess heat generated by the fuel cell is used for boiler feedwater heating. In one embodiment, steam generated by the boiler is used in an operation that converts the steam to condensate, and the condensate is returned to the fuel cell for use as a heat sink for the thermal energy generated within the fuel cell unit.

4 Claims, 3 Drawing Sheets

INTEGRATED BOILER/FUEL CELL SYSTEM

BACKGROUND OF THE INVENTION

This invention relates to boilers. In one aspect, the invention relates to a boiler in combination with a fuel cell while in another aspect, the invention relates to the use of water used to cool the fuel cell as a source of boiler feedwater heating. In another aspect, the invention relates to an integrated boiler/fuel cell system useful for cogenerating steam at various pressures and electricity.

Fuel cells are known to be useful for the cogeneration of electricity and thermal energy (i.e. heat), and they are available in a variety of configurations. Representative fuel cell types include phosphoric acid fuel cells (PAFC), molten carbonate fuel cells (MCFC), solid oxide fuel cells (SOFC), polymer electrolyte fuel cells (PEFC), and alkaline fuel cells (AFC). These cells and their operation are described in *Fuel Cells: A Handbook*, May 1988, published by the United States Department of Energy, which is incorporated herein by reference.

Fuel cells, regardless of their configuration, are designed to produce electrical power. However due to thermodynamic theory and for practical reasons, they also produce thermal energy which must be transferred from the cell (the reactant gases and the cell structure) as heat. Since fuel cells operate best at or near a specified temperature, typically the cell unit is designed with a means for removing this heat. Fluids, such as air and/or water, are generally used as the cooling agent.

In those systems in which water is used as the cooling agent, heat is transferred from the fuel cell system and its reactant gases to water, and subsequently from this water to another fluid (e.g. a mixture of glycol, propylene and water). The thermal energy in this mixture is then transferred as heat in another process, e.g. heating water. While such systems are generally effective for producing hot water (the temperature of which is typically between 150–180 F.), these systems are not capable of or effective at producing steam at various pressures.

Boilers are designed to produce steam, and the water that they convert to steam is known as, among other names, boiler feedwater. This feedwater can enter the boiler at virtually any temperature between ambient and the boiling temperature, however boiler operating efficiencies are enhanced if the feedwater enters the boiler at a temperature approaching the boiling temperature. In many present day boiler operations, the feedwater is preheated to within a desirable temperature range through the use of a fuel-fired burner and/or steam extraction.

SUMMARY OF THE INVENTION

According to this invention, water which is used to remove heat from a fuel cell unit, is utilized, at least in part, as a source for heating boiler feedwater and/or actually becoming a part of the boiler feedwater. In one embodiment, the invention is an integrated fuel cell-/boiler cogeneration system with a water recirculation loop which serves the dual purpose of (i) acting as a cooling agent for the fuel cell unit, and (ii) acting as a heat and/or water source for the boiler feedwater. In this embodiment, condensate return from a process steam or hot water use facility/system and/or make-up water is collected and mixed with the cooling water exiting the fuel cell unit. During this mixing process, the fuel cell cooling water stream transfers heat to the boiler feedwater which increases the thermal energy content of the feedwater (and thus effectively raising its temperature). This water is then transferred to a boiler as feedwater for conversion into process steam and/or hot water. The boiler product steam/hot water is then transported to a steam or hot water use facility. There, it is converted to condensate (by reducing its energy value) in which form it is returned to the fuel cell unit (thus closing the loop). This integrated system does not require a separate fluid cooling jacket or loop for the fuel cell unit thereby effectively utilizing the heat generated within the fuel cell (which needs to be removed). It also provides an efficient means for cogenerating electricity and steam.

In another embodiment, the condensate return from the operation in which process steam is used is mixed with water that serves as the fuel cell cooling agent in an open feedwater heater. This configuration provides a very efficient means of utilizing the excess heat of the fuel cell.

In yet another embodiment, the heat content of the product or combustion gas stream of the boiler is used as an energy source to reform natural gas for use in the fuel cell. This configuration eliminates or reduces the need for a burner assembly in the natural gas reformer.

DESCRIPTION OF THE PREFERRED EMBODIMENTS

Any fuel cell unit that generates thermal energy which needs to be removed from the unit as heat can be used in the practice of this invention. The design, construction and operation of these cells are well known and as noted above, these cells are described in *Fuel Cells: A Handbook*.

Similarly, any boiler capable of producing steam from boiler feedwater can also be used in the practice of this invention. Representative boilers include fire tube boilers, firebox boilers, scotch or marine boilers, water tube boilers, cast iron sectional boilers, and the like. These boilers and their operation are described in *Pape-Swift Boiler Reference Book*, Volume 2, published by Color Art Printing and Stationery Co., which is incorporated herein by reference.

In the figures, like numerals are employed to designate like parts throughout the drawings, and various pieces of equipment, such as valves, fittings, pumps, and the like, are omitted so as to simplify the description of the invention. However, those skilled in the art will realize that such conventional equipment can be employed as desired.

Figure 1:
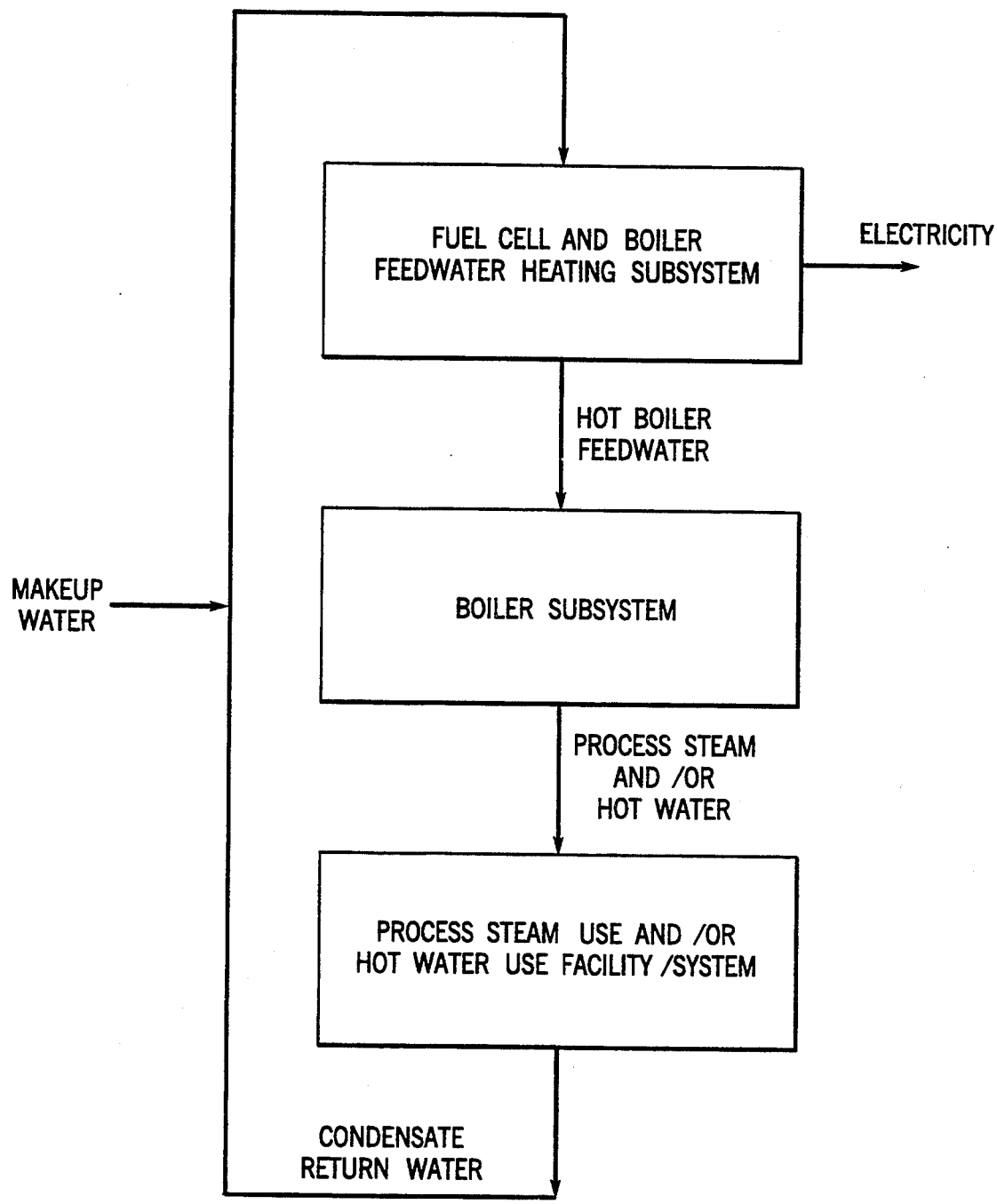
FIG. 1 is a simplified schematic flow diagram of an integrated boiler/fuel cell cogeneration system.

FIG. 1 is a simplified flow diagram in which the invention is described as an integrated fuel-cell/boiler cogeneration system in which heat is transferred from fluids and units within the fuel cell subsystem to the boiler feedwater (condensate return and/or make-up water). Heat generated within the fuel cell subsystem is transferred to the cooling water stream which is circulating about part or all of the subsystem. This heated water then transfers heat to the boiler feedwater stream (by direct or indirect contact heating modes) which is subsequently delivered to the boiler subsystem. The cooling water stream may or may not be used as the boiler feedwater, in whole or in part. Within the boiler subsystem, the water is converted to process steam and/or hot water, and then transferred to an operation in which it is used. During its use, heat is removed from the steam or hot water resulting in its conversion to a condensate water stream. This condensate (along with some or all of the process steam, albeit with a lower heat value) is returned to the fuel cell subsystem in order to serve as a heat sink for the thermal energy generated in the fuel cell unit. The system operates in a closed fashion although make-up water can be added at any point or points in the circuit as required or desired.

Figure 2:
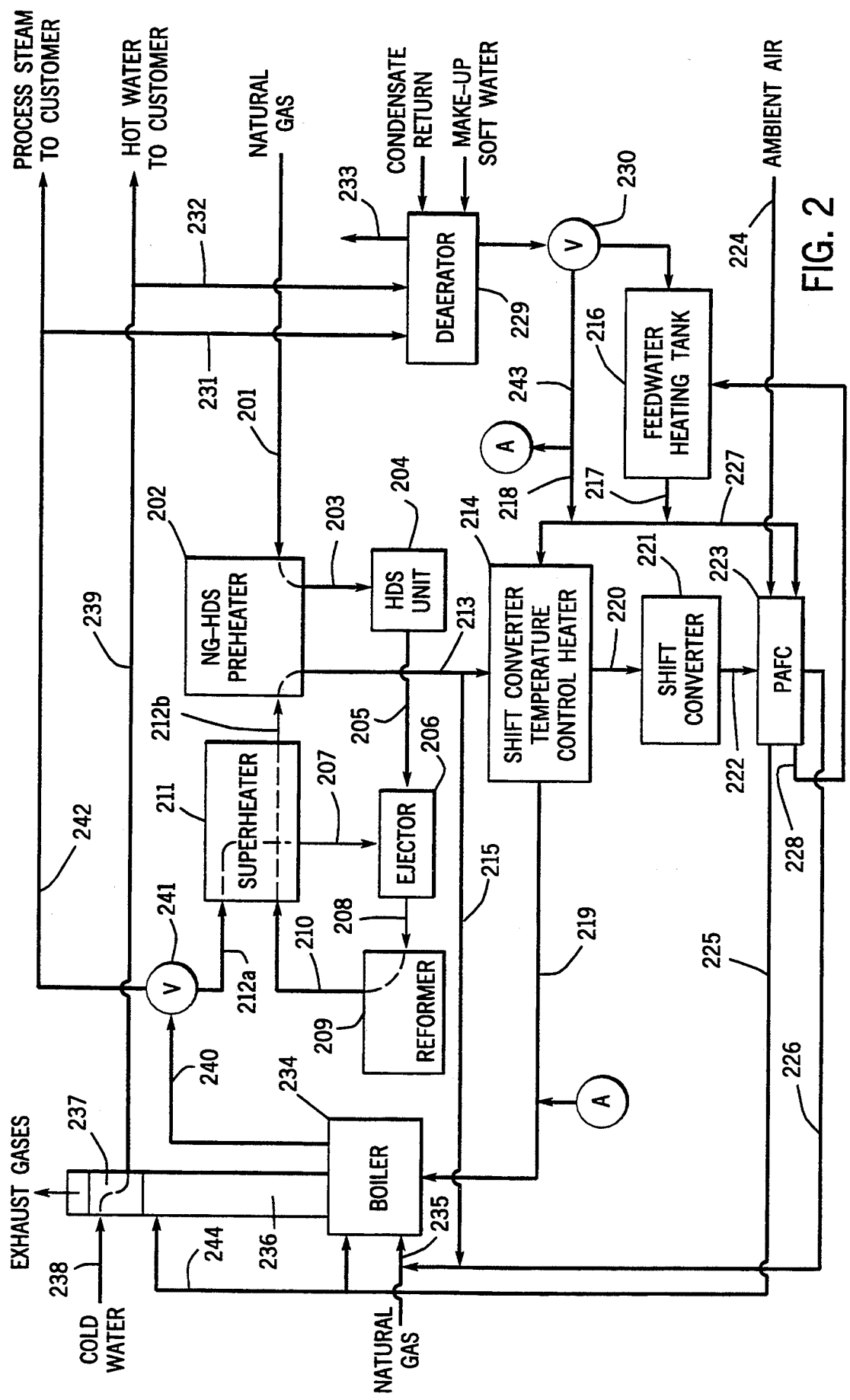
FIG. 2 is a schematic flow diagram of one embodiment of this invention which employs a phosphoric acid fuel cell.

FIG. 2 is a schematic flow diagram of one embodiment of this invention which employs a phosphoric acid fuel cell. Natural gas is fed by way of pipe 201 to a natural gas hydrodesulfurization (HDS) preheater 202 in which the temperature of the natural gas is raised to between about 400 and about 600 F. The heated natural gas is then forwarded by way of pipe 203 to HDS 204 in which sulfur, typically in the form of hydrogen sulfide, is removed from the natural gas. Suppliers of natural gas usually blend into the gas small amounts, e.g. less than about 10 ppm, of hydrogen sulfide as a means for detecting pipeline or other gas-handling equipment leaks. Sulfur in almost any form is detrimental to the operation of a PAFC and as such, the hydrogen sulfide must be removed to a level of less than about 0.05 ppm prior to the introduction of the natural gas or its reformed products into the fuel cell. Of course, if the natural gas does not contain detrimental levels of sulphur, then the HDS unit can be eliminated.

The desulfurized gas is drawn into ejector 206 by way of pipe 205 in which it receives a temperature and pressure boost from steam delivered from superheater 211 through pipe 207. In one embodiment of this invention, the desulfurized gas in pipe 205 is at a pressure less than atmospheric, and it is thus drawn from HDS unit 204 into ejector 206. The relative amounts of steam and desulfurized gas that are blended to form the mixture that is conveyed through pipe 208 to reformer 209 can vary to convenience, but a typical steam to carbon ratio through pipe 208 is between about 2.5:1 and about 3.5:1. The optimum ratio is dependent upon a number of different factors, relative to the system operation and/or emission constraints.

The pressure of the gas/steam mixture delivered to reformer 209 is between about 3 and about 10 psig. In the reformer, the natural gas, i.e. methane, is catalytically converted to hydrogen and carbon monoxide at a temperature in the range of about 600 to about 1200 F. The reformed gas stream product is then forwarded through pipe 210 into superheater 211 in which its temperature is lowered by about 200 to about 300 F. as a result of heat transfer from the reformed gas to the process steam delivered to superheater 211 from pipe 212a. The reformer product gas and process steam do not intermingle in superheater 211. The heat transfer is accomplished indirectly through pipe walls.

The reformed gas is then transferred from superheater 211 by way of pipe 212b into preheater 202 in which a portion of the thermal energy of the reformed gas is used to preheat the natural gas prior to its introduction into HDS unit 204. Here too, the reformed gas and the natural gas do not come into direct contact with one another.

The reformed gas from preheater 202 is transferred to shift converter temperature control heater 214 by way of pipe 213. In one embodiment, the volume of reformed gas fed to control heater 214 is controlled by bleeding excess reformed gas from pipe 213 by way of pipe 215 for eventual combustion in boiler 234. The temperature of the reformed gas is lowered in control heater 214 to between about 250 and about 400 F. through heat exchange with boiler feedwater which is received from feedwater system heating tank 216 and/or through pipes 243 and 218. The preheated feedwater is then transferred from control heater 214 to boiler 234 by way of pipe 219.

The reformed gas is transferred from control heater 214 to shift converter 221 by way of pipe 220. In shift converter 221, the hydrogen content of the reformed gas is increased by way of the water gas shift reaction, and the product gas of this shift reaction unit is fed by way of pipe 222 as fuel to fuel cell unit 223. In those embodiments in which the fuel cell is other than a phosphoric acid fuel cell, e.g. MCFC, SOFC, PEFC, etc., shift converter 221 may be eliminated and if necessary or desired, replaced with another unit(s) with the function of preparing the fuel for the fuel cell.

Fuel cell unit 223 converts a portion of the energy of the shift converter product gas into electrical power and thermal energy of the gaseous byproducts. Oxygen is fed to fuel cell unit 223 in the form of ambient air by way of pipe 224, and the exiting, oxygen-depleted excess air stream, now heated to a temperature between about 300 and about 450 F. is removed from fuel cell 223 by way of pipe 225 for either oxygen requirements in boiler 234 or delivered to the gas heat absorber 237 by way of pipe 244. The fuel-side gaseous by-products, e.g. hydrogen, methane, water vapor, carbon dioxide, nominal levels of $NO_x$, etc., are discharged from fuel cell unit 223 by way of pipe 226 for mixture with either natural gas feed delivered through pipe 235 or reformed gas delivered through pipe 215, both for ultimate combustion in boiler 234. Thermal energy generated within fuel cell unit 223 is transferred from the gas reactant/product streams and the fuel cell unit structure to water circulating within a cooling jacket which is within the fuel cell unit structure (details not shown). This cooling water is provided from feedwater heating tank 216 by way of pipes 217 and 227, and the water is removed from the jacket surrounding fuel cell 223 by way of pipe 228. The temperature of the water as delivered from pipe 227 is between about 275 and about 325 F., and the temperature of the water in pipe 228 is between about 350 and about 375 F.

Pipe 228 recycles water back to feedwater heating tank 216 in which it is mixed with water from deaerator 229 by way of pipe 230. The water in deaerator 229 is soft, i.e. its natural bivalent metal ion (e.g. calcium, magnesium, etc.) content is reduced, to eliminate or reduce scaling or fouling problems, and it can be delivered to deaerator 229 from one or more different sources, e.g. condensate return from an operation which uses process steam and/or hot water delivered from boiler 234, a bleed stream of process steam (pipe 231), a bleed stream of hot water (pipe 232), make-up soft water, etc. The deaerator 229 is vented through pipe 233 to remove noncondensible gases.

Feedwater heating tank 216 as shown is an open mixing tank, i.e. the water from deaerator 229 delivered by pipe 230 is intimately mixed with the water delivered from fuel cell 223 by way of pipe 228. In another embodiment, feedwater heating tank 216 is replaced with a closed or indirect contact feedwater heater (not shown). The water from pipe 228 raises the temperature of the water from pipe 230 from about 175 to about 300 F.

Boiler 234 is fired with natural gas delivered by way of pipe 235. As noted earlier, the natural gas can be blended with the by-product gases from fuel cell 223 by way of pipe 226, and it can also be blended with excess reformer product gas bled from pipe 213 by way of pipe 215. As shown conceptually in the embodiment of FIG. 2, reformed gas is first blended with the fuel cell by-product gas at the juncture of pipes 226 and 215, and this blend is then mixed with the natural gas in pipe 235.

The combustion or flue gases resulting from the operation of boiler 235 are removed by way of stack 236 which is equipped with a stack gas heat absorber 237. Stack gases typically comprise water vapor, carbon dioxide, nitrogen, oxygen and very low levels of $NO_x$. Cold water, typically soft cold water, is fed to heat absorber 237 by way of pipe 238, absorbs heat from the exiting exhaust gases in a direct contact heating/cooling process, and exits heat absorber 237 by way of pipe 239 for ultimate usage as hot water (temperature between about 130 and about 170 F). As noted earlier, some of this hot water can be diverted to deaerator 229 by way of pipe 232.

Boiler feedwater is introduced to boiler 234 by way of pipe 219 from control heater 214. In addition, water can be diverted directly from deaerator 229 by way of pipe 243 (depicted as A in FIG. 2).

The boiler feedwater is converted to saturated steam with a temperature corresponding to desired boiling pressure or not water at a desired pressure and temperature. This process steam and/or hot water leaves boiler 234 by way of pipe 240. The process steam and/or hot water is fed into bivalve 241 in which the bulk of the process steam/hot water is diverted to pipe 242 for eventual delivery to an operation which requires process steam. As noted earlier, a portion of this process steam/hot water can be diverted to deaerator 229 by way of pipe 231. The remainder of the process steam/hot water is diverted to superheater 211 by pipe 212 for use in superheating the reformer process gas.

Figure 3:
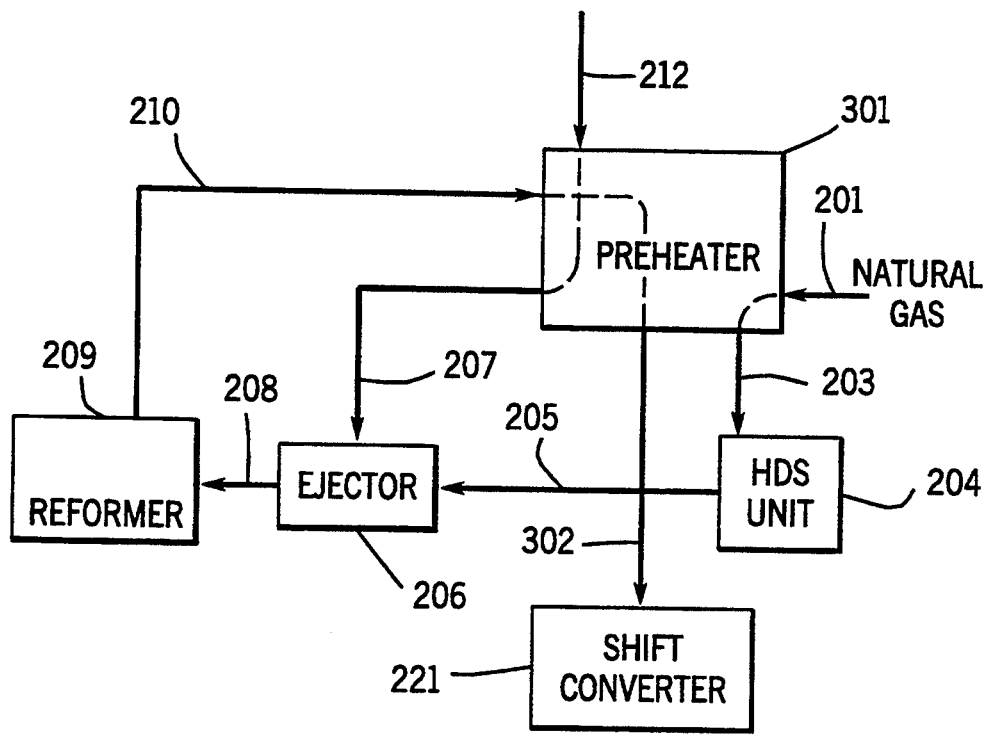
FIG. 3 is a schematic flow diagram of one embodiment of the preheater section of FIG. 2.

FIG. 3 is a schematic flow diagram in which natural gas/HDS preheater 202, superheater 211, and shift converter temperature control heater 214 are combined into integrated, single unit preheater 301. Natural gas is delivered to preheater 301 by pipe 201 and it is heated to a temperature between about 400 and about 600 F. through indirect (i.e. without intimate contact with one another) heat exchange with reformed gas delivered by way of pipe 210. The heated natural gas is then transferred from preheater 301 to HDS unit 204 by way of pipe 203. Desulfurized natural gas from HDS unit 204 is transferred by way of pipe 205 to ejector 206. Here it receives an increase in temperature and pressure by direct intermixing with process steam delivered from preheater 301 by way of pipe 207, and the resultant mixture is transferred to reformer 209 by way of pipe 208. The reformer product gas is transferred to preheater 301 by way of pipe 210 and then transferred to shift converter 221 by way of pipe 302.

Figure 4:
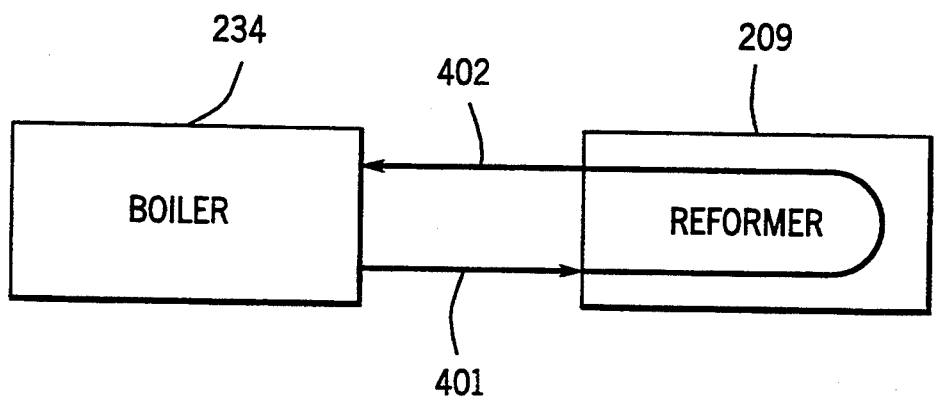
FIG. 4 is a schematic flow diagram of one embodiment of the boiler/reformer arrangement of FIG. 2.

FIG. 4 describes another embodiment of this invention in which the combustion or flue gas from boiler 234 is passed through reformer 209 by way of pipes 401 and 402. In this embodiment, heat from the transferred flue gas is used to provide at least part of the thermal energy required to reform natural gas to hydrogen and carbon monoxide. As in superheater 211, the gases do not contact or intermingle directly with one another, rather the heat is transferred from one to the other indirectly through intermediary structures such as pipe walls. Typically, the transferred combustion gases are from the first pass of a multipass boiler.

The ultimate products of the integrated system of this invention are process steam, electrical power, and optionally hot water. This unique coupling of a fuel cell with a boiler results in an efficient means to generate electricity and process steam with less objectionable emissions (e.g. $NO_x$, carbon dioxide, etc.). Since most fuel cells are modular in nature, the integrated system can be scaled to desired size ranging from those that fit on a semi-trailer bed to large utility facilities.

Although the invention has been described in considerable detail through the figures and above discussion, many variations and modifications can be made by one skilled in the art without departing from the spirit and scope of the invention as described in the following claims.

What is claimed is:

1. An integrated boiler/fuel cell system useful for cogenerating electricity and steam or hot water, the system comprising:
   A. a boiler adapted to producing steam or hot water from boiler feedwater;
   B. a fuel cell which produces electricity and as a by-product, thermal energy; and
   C. a fuel cell cooling and boiler feedwater heating apparatus in which water is used as a cooling agent, and in which (i) the water is circulated about the fuel cell subsystem in a manner that captures at least a portion of the by-product heat such that the temperature of the water is elevated, and (ii) this water at the elevated temperature is used as or transferred to and used to at least partially heat the boiler feedwater to a desired temperature.

2. The system of claim 1 further comprising an operation which receives the steam or hot water produced by the boiler, converts the steam or hot water to condensate, and returns the condensate to the integrated boiler/fuel cell system for use as a heat sink for thermal energy produced in the fuel cell subsystem.

3. A method of preheating boiler feedwater, the method comprising:
   A. circulating water through a fuel cell unit comprising reactant gases and structure that produces electricity and as a by-product, thermal energy, in such a manner that a portion of the thermal energy is transferred in the form of heat from the reactant gases and fuel cell unit structure to the water; and
   B. using the water as a means of heating a boiler feedwater or using the water as at least a portion of the boiler feedwater.

4. A method of providing a continuous heat source for gas reforming in an integrated boiler/fuel cell system comprising a boiler and a reformer, the method comprising:
   A. circulating boiler product gas from the boiler to the reformer such that heat is transferred from the boiler product gas to the reformer process gas; and
   B. returning the now lower temperature boiler product gas to the boiler.

* * * * *